July 5, 1932. F. E. LEAHY 1,865,929
CONTROL MECHANISM FOR GAS PRODUCERS
Filed July 2, 1926
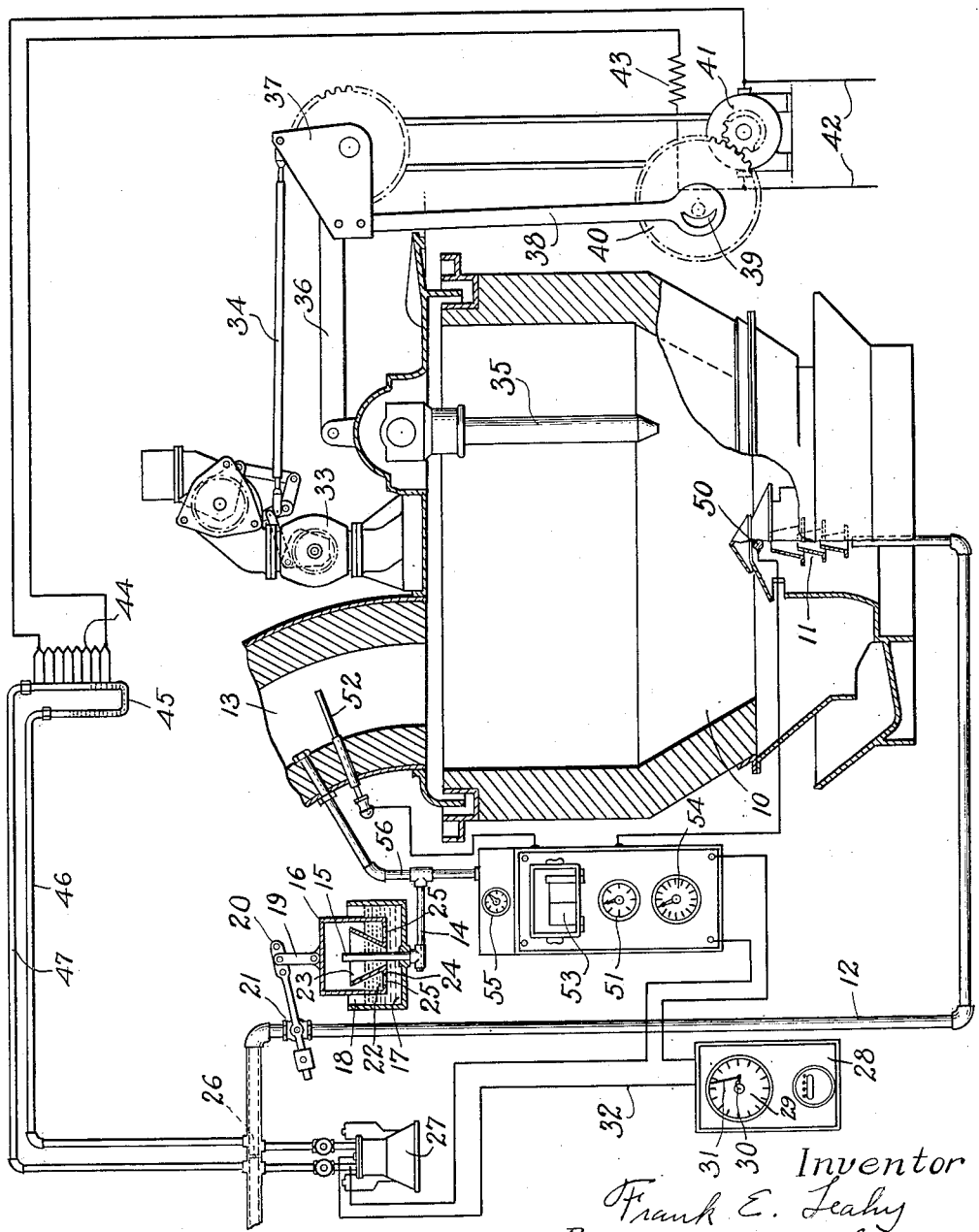
Inventor
Frank E. Leahy
By Nissen & Crane
Attys.

Patented July 5, 1932

1,865,929

UNITED STATES PATENT OFFICE

FRANK E. LEAHY, OF PITTSBURGH, PENNSYLVANIA, ASSIGNOR TO REPUBLIC FLOW METERS CO., OF CHICAGO, ILLINOIS, A CORPORATION OF ILLINOIS

CONTROL MECHANISM FOR GAS PRODUCERS

Application filed July 2, 1926. Serial No. 120,114.

This invention relates to mechanism for regulating the operation of a gas producer or other apparatus of a similar nature, and has for its object the provision of such mechanism by means of which the output of the gas producer and the ingredients supplied to the gas producer may be accurately measured and controlled, as well as the conditions of operation of the producer.

The invention is exemplified in the combination and arrangement of parts shown in the accompanying drawing and described in the following specification, and it is more particularly pointed out in the appended claims.

In the drawing, the figure is a vertical sectional diagrammatic view showing a gas producer equipped with measuring and controlling instruments according to one embodiment of the present invention.

The apparatus illustrated includes a gas producer 10 to which a blast of air and steam is supplied by means of an aspirator 11 to which steam is fed through a pipe 12. The jet of steam draws a blast of air into the producer gas generating chamber, the amount of air being directly dependent upon the quantity of steam introduced, for the reason that the aspirator produces a completely saturated mixture of steam and air. It will be understood that instead of an aspirator a turbo-blower may be used since this form of blower also gives a constant ratio of steam to air. The amount of steam passing through the pipe 12 is controlled by a valve 21 operated by a lever 20 which, in turn, is connected by a link 19 to a bell float 16. The producer 10 is connected with a gas main 13 which conducts the gas produced to apparatus in which it is consumed but not shown. A tube 14 communicates with the interior of the main 13 and opens at 15 within the bell float 16. The float 16 is supported in a liquid 17 contained in a vessel 18. It will be readily apparent that changes in the gas pressure in the main 13 will change the height of the float 16 and thus control the passage of steam through the pipe 12. The float 16 may be provided with a chamber 22 formed by an annular inclined wall 23 and a bottom wall 24 to exert a damping action on the movement of the float. Perforations 25 provide communication under the seal between the chamber 22 and the interior of the vessel 18. The float construction and its connection with the producer are more completely described and claimed in my U. S. Patent No. 1,777,145, dated September 30, 1930.

The steam pipe 12 is provided with a restricted orifice 26 for producing a differential pressure due to flow of steam in the pipe. A flow-meter 27 is connected to the pipe 12 at opposite sides of the orifice 26 and is provided with an electrical indicating instrument 28. The flow-meter may be of any well known or approved construction having either electrical or mechanical means for indicating the rate of flow. In the form shown, a variable resistance is controlled by the differential pressure produced by the flow of steam. In the drawing, I have illustrated a flow-meter of the type shown in the patent of Jacob M. Spitzglass, No. 1,601,743, dated October 5, 1926. The electrical instrument 28 is preferably of the recording type having a dial driven by clockwork and provided with a circular chart 29 upon which a line is drawn by a pen 30 carried by a pointer 31 which is controlled by the current in the circuit 32 connected with the flow-meter 27 in a well known manner.

Since the amount of air introduced into the gas producer is a direct function of the amount of steam, and since there is always an excess of coal present in the producer, the amount of gas produced will be approximately a direct function of the amount of steam passing through the pipe 12. The chart 29 may therefore be calibrated to indicate directly the amount of gas produced in cubic feet per minute, or any other convenient unit. A chart so graduated is indicated in the drawing. Instead of indicating the quantity of gas produced, the chart may be graduated to indicate the approximate quantity of coal consumed in any suitable unit, as pounds per hour. This last form of graduation will probably be preferred in most installations of gas producers since it is the measurement most desired, for a check upon the operation of the gas producer.

It has heretofore been impractical to provide an indicator which gave a check upon the operation of the gas producer for the reason that the gas produced contains material which clogs up and renders inoperative any flow-meter apparatus connected directly with the gas main 13. Advantage is therefore taken in the present invention of the direct functional relation between the steam supplied and the gas generated to measure inferentially the amount of gas supplied or coal consumed, by measuring the flow of steam to the producer.

In order that the producer may be continuously supplied with an adequate amount of coal, mechanical apparatus designated generally by the numeral 33 is provided for supplying coal to the producer. Any suitable mechanical feed may be used for this purpose and the specific construction of the form illustrated need not therefore be described. The feeding apparatus is operated by a reciprocating link 34 and the rate of feed depends upon the rate of reciprocation of the link. The gas producer is also provided with an agitator or poker 35 which is reciprocated by a link 36. The links 34 and 36 are connected to an oscillating quadrant 37 which, in turn, is oscillated by a link 38 connected by an eccentric 39 to a gear wheel 40. The gear wheel 40 is driven by a motor 41 supplied with current from any suitable source 42 and having a field winding 43. The field winding 43 is connected in series with a variable resistance 44 controlled by a differential pressure contact device 45 of any suitable construction. The form of device shown in the drawing is that of a U-shaped tube having a column of mercury arranged to short-circuit portions of the resistance 44 as the differential pressure on the column changes. The U tube is connected by pipes 46 and 47 to the steam pipe 12 at opposite sides of the restricted orifice 26. It will be apparent that an increase in the flow of steam in the pipe 12 will decrease the height of the column of mercury in the U tube 45 and thus increase the resistance in the field circuit and consequently speed up the motor 41. This will result in an increase of coal fed to the producer corresponding to the increase in the steam supply. It will readily be seen that the apparatus will automatically respond to any change in the demand for gas placed thereon. An increase demand will tend to decrease the pressure in the main 13 which will operate the float 16 to increase the steam supply. This will automatically correspondingly increase the supply of air through the operation of the aspirator 11 and will also increase the supply of coal through the operation of the control resistance 44 of the motor field circuit. The increased rate of operation will be immediately indicated by the instrument 28 and recorded on the instrument chart. A decrease in the demand for gas will produce a corresponding opposite operation of the various control instruments.

The degree of accuracy of the indications of the instruments 28 will depend upon the constant character of the mixture of steam and gas introduced into the gas producer. This is a saturated mixture, as previously explained, and will be constant for a given temperature. The proportions will, of course, vary for different temperatures and in order that the readings may be checked in this respect, a thermometer bulb 50 is located in the blast at the base of the producer gas generating chamber and connected with a recording instrument 51 by means of which a record is kept of the blast temperature. The instrument 28 is calibrated to read correctly for the preferred blast temperature and this temperature is then maintained as close as practical to the preferred temperature.

For any fuel the temperature of the gas produced will remain substantially constant so long as the operation of the gas producer is normal; that is, so long as there are no changes in the fuel bed thickness or the blast temperature. The calorific value of the gas will depend on the blast temperature, increasing with a decrease in the blast temperature. For this reason, it is important that some means be provided to measure the blast temperature to enable the operator to detect quickly any departure from normal working conditions. Abnormal conditions affect the producer efficiency and the flame temperature of the gas produced. If the flame temperature is too cold, the percentage of undecomposed steam will increase and the calorific value of the gas will correspondingly decrease. The temperature of the gas produced as measured in the gas main is an accurate indication of the operation of the producer. It is therefore advisable to provide a thermo-couple shown at 52 in the gas main and connected to a pyrometer instrument 53. In this way, a temperature record of the blast and also of the gas temperature, is obtained and forms an accurate check on the operation of the producer.

By using a recording pyrometer and observing the temperature of the gas obtained during periods of good production and also during periods of poor production, the best operating temperature can soon be determined. This, of course, can be checked by calculations of the flame temperature possible from the gas analysis, but, in this connection, it is sometimes desirable to operate at a higher temperature than is theoretically most efficient in order to prevent condensation of tar in the flues and checker chambers of the furnaces supplied with gas from the producer.

When the gas is supplied to furnaces, it will soon be noticed that there is a minimum temperature of the gas below which it is not desirable to operate. There is quite a range above the minimum working temperature where the furnace efficiency will be good and for Pittsburgh coal, a safe operating range of gas temperature lies between 1,300° F. and 1,600° F., with the most desirable temperature close to 1,450° F.

The pyrometer readings are of great value in regulating the operation of the producer after it has been shut down for cleaning. If, after cleaning, the producer is put back into operation too quickly, before the fuel bed has been properly conditioned, the pyrometer at the top of the producer may indicate a temperature as high as 2,000° F. By carefully watching the pyrometer reading, however, the producer may be put back into operation without disturbing the quality of the gas, by increasing the blast slowly for an hour or two after the cleaning has been completed. Since the quality of the gas is dependent upon the temperature, a pyrometer to indicate this temperature is as important to gas producer operation as a pressure gage is to a boiler.

The circuit 32 of the flow meter 27 may be provided with more than one electrical instrument, if desired. In the drawing, in addition to the recording instrument 28, an indicating instrument 54 is shown in series with the instrument 28 by means of which the rate of operation of the gas producer is indicated in the operating room. The instrument board may also be provided with a recording pressure gage 55 which is connected by a pipe 56 to the interior of the gas main 13. This provides a check on the operation of the float 16 and the valve 21 and gives a constant indication as to whether or not the controlling apparatus maintains a substantially constant pressure within the gas main.

I claim:—

1. A gas producer comprising a producer gas generating chamber adapted to contain a solid fuel bed, an air and steam blast inlet in the bottom portion of the producer, and leading to the fuel bed, a fuel feeder mounted at the top of the producer, an electric motor connected to control the fuel feeder, a producer gas outlet main leading from the top of the gas generating chamber, a steam pipe for conducting steam to the blast inlet, a control valve in the steam pipe, a gas pressure regulator connected to the outlet main and to the steam control valve, a U-shaped mercury tube connected to the steam pipe, and electrical connections connected to the electric motor and controlled by the mercury tube.

2. A gas producer comprising a producer gas generating chamber adapted to contain a solid fuel bed and having an air blast inlet to the fuel bed, fuel agitating means in said gas generating chamber, a fuel feeder for supplying fuel to said chamber, an electric motor connected to control both the agitating means and the fuel feeder, a producer gas outlet main leading from the gas generating chamber, a steam pipe for conducting steam to the blast inlet, control means in the steam pipe for regulating the flow of steam therethrough, a gas pressure regulator connected to the outlet main and to the control means, flow responsive means connected to the steam pipe, and electrical connections connected to the electric motor and controlled by the flow responsive means.

3. A gas producer comprising a producer gas generator adapted to contain a fuel bed, an air and steam blast inlet means leading to said bed, a fuel agitator for said fuel bed, a fuel feeder for supplying fuel to the fuel bed, power means for operating both said agitator and fuel feeder, a producer gas outlet main leading from the gas generating chamber, a conduit for conducting steam to the blast inlet means, control means for said conduit, pressure responsive means connected to the outlet main and to the control means, and a U-shaped mercury tube connected to the steam pipe and connections therefrom to the power means.

In testimony whereof I have signed my name to this specification on the 21st day of June, A. D. 1926.

FRANK E. LEAHY.